United States Patent
Omori et al.

(10) Patent No.: US 6,909,594 B2
(45) Date of Patent: Jun. 21, 2005

(54) NIOBIUM POWDER FOR CAPACITOR, SINTERED BODY USING THE POWDER AND CAPACITOR USING THE SAME

(75) Inventors: Kazuhiro Omori, Chiba (JP); Kazumi Naito, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 268 days.

(21) Appl. No.: 10/600,358

(22) Filed: Jun. 23, 2003

(65) Prior Publication Data

US 2004/0008469 A1 Jan. 15, 2004

Related U.S. Application Data

(63) Continuation of application No. 09/842,627, filed on Apr. 27, 2003, now Pat. No. 6,643,120.
(60) Provisional application No. 60/232,433, filed on Sep. 14, 2000.

(30) Foreign Application Priority Data

Apr. 28, 2000 (JP) .................................. P2000-131288

(51) Int. Cl.$^7$ .............................................. H01G 9/045
(52) U.S. Cl. ....................... 361/509; 361/508; 361/502; 361/504; 361/511; 361/512
(58) Field of Search .................................. 361/508, 502, 361/503, 509, 512, 516, 523, 528, 529, 303, 301, 504, 511, 525, 524

(56) References Cited

U.S. PATENT DOCUMENTS

| | | |
|---|---|---|
| 3,815,224 A | 6/1974 | Pickus et al. |
| 4,149,173 A | 4/1979 | Schmelz et al. |
| 4,318,995 A | 3/1982 | Rhodes et al. |
| 4,684,399 A | 8/1987 | Bergman et al. |
| 5,568,353 A | 10/1996 | Bai et al. |
| 5,772,924 A | 6/1998 | Hayashi et al. |
| 6,115,235 A | 9/2000 | Naito |
| 6,165,623 A | 12/2000 | Fife et al. |
| 6,215,652 B1 | 4/2001 | Yoshida et al. |
| 6,335,858 B1 | 1/2002 | Vasechkin et al. |
| 6,643,120 B2 * | 11/2003 | Omori et al. ............... 361/508 |

* cited by examiner

*Primary Examiner*—Dean A. Reichard
*Assistant Examiner*—Nguyen T. Ha
(74) *Attorney, Agent, or Firm*—Sughrue Mion, PLLC

(57) ABSTRACT

An object of the present invention is to provide an antimony-containing niobium sintered body for a capacitor having a small specific leakage current value, an antimony-containing niobium powder for use in the sintered body, and a capacitor using the sintered body. In the present invention, an antimony-containing niobium powder having an antimony content of preferably about 0.1 to about 10 mol % and an average particle size of preferably about 0.2 to about 5 μm is used. By using this antimony-containing niobium powder, a sintered body and a capacitor are constructed.

20 Claims, No Drawings

NIOBIUM POWDER FOR CAPACITOR, SINTERED BODY USING THE POWDER AND CAPACITOR USING THE SAME

CROSS REFERENCE TO RELATED APPLICATIONS

This is a continuation of application No. 09/842,627 filed Apr. 27, 2003, now U.S. Pat. No. 6,643,120, which claims benefit pursuant to 35 U.S.C. §119(e)(1) of the filing date of Provisional Application 60/232,433 filed Sep. 14, 2000 pursuant to 35 U.S.C. §111(b); the disclosures of which are incorporated herein by reference.

FIELD OF THE INVENTION

The present invention relates to a niobium powder for capacitors, having a large capacitance per unit mass and good specific leakage current properties. The present invention also relates to a sintered body using the powder and a capacitor using the sintered body.

BACKGROUND OF THE INVENTION

There is a demand for capacitors for use in electronic instruments, such as portable telephones and personal computers, to have a small size and a large capacitance. Among these capacitors, a tantalum capacitor is preferred because of its large capacitance for its size and good performance. In the tantalum capacitor, a sintered body of tantalum powder is generally used for the anode moiety. In order to increase the capacitance of the tantalum capacitor, it is necessary to increase the mass of the sintered body or to use a sintered body with an increased the surface area by pulverizing the tantalum powder.

The method of increasing the mass of the sintered body unavoidably causes enlargement of the capacitor shape, and thus, cannot satisfy the requirement for downsizing. On the other hand, in the method of pulverizing tantalum powder to increase the surface area, the pore size of the tantalum sintered body decreases or closed pores increase at the stage of sintering. Therefore, impregnation of a cathode agent in a later process becomes difficult. As means for solving these problems, a capacitor using a sintered body of powder of a material having a dielectric constant larger than that of tantalum is being studied. Materials having a larger dielectric constant include niobium and titanium.

However, the sintered body produced from these materials is not satisfactory because of its large "specific leakage current value". Elemental niobium or titanium has a large dielectric constant, and therefore, a capacitor having a large capacitance may be obtained. However, a small "specific leakage current value" is a key point for obtaining a capacitor having good reliability. By evaluating the leakage current value per capacitance, namely, "specific leakage current value", it can be estimated whether a large capacitance can be obtained in a state where leakage current value is reduced to a practically usable value or less.

The "specific leakage current value" as used herein is defined as a value obtained when a dielectric layer is formed on the surface of a sintered body by electrolytic oxidation, and a leakage current value when a voltage corresponding to 70% of the chemical forming voltage is continuously applied at room temperature for 3 minutes is divided by the product of the chemical forming voltage during electrolytic oxidation and the capacitance. That is, Specific leakage current value=$(LC/(C \times V))$ (LC: leakage current value, C: capacitance, and V: forming voltage).

In the case of a sintered body using a tantalum powder, the specific leakage current value obtained from the capacitance and the leakage current value described in the catalogue "CAPACITOR GRADE TANTALUM" of Showa Cabot Super Metal is 1,500 pA/($\mu$F·V) or less. In general, the measured specific leakage current value for guaranteeing this specific leakage current value is said to be from 1/3 to 1/4 of the value in the catalogue and is preferably 400 pA/($\mu$F·V) or less.

However, in conventional sintered body capacitors where a niobium powder using elemental niobium or a titanium powder is used, the specific leakage current value is large and exceeds the above-described value. Accordingly, these capacitors are lacking in reliability as a capacitor and are not used in practice.

JP-A-55-157226 (the term "JP-A" as used herein means an "unexamined published Japanese patent application") discloses a method for producing a sintered element for capacitors, where agglomerated powder is molded under pressure into a niobium fine powder having a particle size of 2.0 $\mu$m or less, the fine powder is sintered, the molded and sintered body is cut into fine pieces, a lead part is joined thereto, and then these pieces are again sintered. However, this patent publication discloses neither a niobium powder containing antimony nor properties of the capacitor manufactured using this powder.

U.S. Pat. No. 4,084,965 discloses a capacitor manufactured using a niobium powder of 5.1 $\mu$m obtained by hydrogenating a niobium ingot and pulverizing it. However, U.S. Pat. No. 4,084,965 discloses neither a niobium powder containing antimony nor properties of the capacitor manufactured using this powder.

JP-A-10-242004 discloses a technique of partially nitriding niobium, thereby improving the leakage current value. However, JP-A-10-242004 discloses neither a niobium powder containing antimony nor properties of the capacitor manufactured using this powder.

SUMMARY OF THE INVENTION

An object of the present invention is to provide a niobium powder for capacitors, which can yield a capacitor having a large capacitance per unit mass and good specific leakage current properties; a sintered body using the powder; and a capacitor using the sintered body.

As a result of extensive investigations, the present inventors have accomplished the present invention, which comprises the following embodiments.

(1) A niobium powder for capacitors, comprising niobium and antimony.

(2) The niobium powder for capacitors as described in 1 above, wherein the content of antimony is from about 0.1 to about 10 mol %.

(3) The niobium powder for capacitors as described in 1 or 2 above, wherein the average particle size of the powder is from about 0.2 $\mu$m to less than about 5 $\mu$m.

(4) The niobium powder for capacitors as described in any one of 1 to 3 above, wherein the niobium powder comprises at least one member selected from the group consisting of niobium nitride, niobium carbide, niobium boride and niobium sulfide.

(5) A sintered body using the niobium powder described in any one of 1 to 4 above.

(6) The sintered body as described in 5 above, which has a specific leakage current value of about 400 pA/($\mu$F·V) or less.

(7) A capacitor comprising the sintered body described in 6 above as one electrode, a dielectric material formed on the surface thereof, and a second electrode.

(8) The capacitor as described in 7 above, wherein the dielectric material comprises niobium oxide.

(9) The capacitor as described in 8 above, wherein the niobium oxide is formed by electrolytic oxidation.

(10) The capacitor as described in 7 above, wherein the second electrode is at least one material (compound) selected from an electrolytic solution, an organic semiconductor and an inorganic semiconductor.

(11) The capacitor as described in 7 above, wherein the another part electrode is formed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by formula (1) or (2):

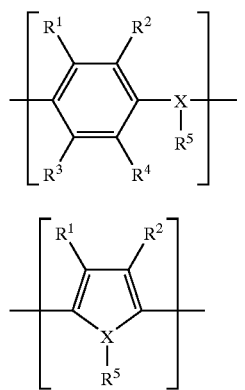

wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$, or $R^3$ and $R^4$ may be combined with each other to form a ring.

(12) The capacitor as described in 10 above, wherein the organic semiconductor is at least one member selected from polypyrrole, polythiophene and substitution derivatives thereof.

DESCRIPTION OF THE PRESENT INVENTION

In the present invention, the capacitance of a capacitor is generally represented by the following formula:

Capacitance $C=\in \times (S/d)$ (C: capacitance, $\in$: dielectric constant, S: specific surface area, and d: distance between electrodes).

Here, $d=k \times V$ (k: constant, V: forming voltage), therefore, $C=\in \times (S/(k \times V))$ and then $C \times V=(\in /k) \times S$. When the specific leakage current value is defined as $(LC/(C \times V))$ (LC: leakage current value), the following formula is established:

Specific leakage current value:

$=(LC/(C \times V))$ $=(LC/((\in /k \times S))$

From this formula, it is considered that the specific leakage current value can be reduced by any one method selected from a method of reducing LC, a method of increasing $(C \times V)$, a method of increasing $\in$ and a method of increasing S.

In the present invention, the antimony-containing niobium powder for use in the production of a sintered body is preferably specified to have an average particle size of less than about 5 μm, so that the specific surface area of the powder can be increased. As a result, a large CV value and in turn, a small specific leakage current value can be attained.

However, if the average particle size of the antimony-containing niobium powder is less than 0.2 μm, impregnation of a cathode agent becomes difficult as described above when a sintered body is produced from the powder, and as a result, the fabricated capacitor cannot have a large capacitance. Based on these reasons, the average particle size of the antimony-containing niobium powder of the present invention is preferably specified to a value of about 0.2 μm to less than about 5 μm and in this range, the specific leakage current value can be made small.

Niobium is known to have a dielectric constant ($\in$) as large as about two times the dielectric constant of tantalum. However, whether or not antimony is a valve metal was not known and accordingly, whether or not $\in$ increases by incorporating antimony into niobium was not known prior to the present invention In addition, niobium has a high bonding strength to an oxygen element compared with tantalum, and therefore, oxygen in the electrolytic oxide film is liable to diffuse toward the internal niobium metal side. On the other hand, in a sintered body of the present invention, a part of niobium is bonded to antimony and therefore, it is presumed that oxygen in the electrolytic oxide film is not easily bonded to the internal niobium metal and is inhibited from diffusing toward the metal side. As a result, the stability of the electrolytic oxide film can be maintained and the effect of reducing the LC can be obtained.

The sintered body obtained by the present invention exhibits a good specific leakage current value, as described above, and a preferred value of about 400 pA/(μF·V) or less. In the present invention, the specific leakage current value can be further reduced to about 300 pA/(μF·V) or less by using a preferred antimony content and average particle size of the antimony-containing niobium powder.

One embodiment of the present invention for obtaining the sintered body of the present invention is described below. The antimony content in the antimony-containing niobium powder used for producing a sintered body is an important feature of the present invention. If the antimony content is too small, the oxygen in the electrolytic oxide film cannot be inhibited from diffusing toward the internal niobium metal side, and as a result, the stability of the electrolytic oxide film cannot be maintained and the effect of reducing LC cannot be obtained. If the antimony content is excessively large, the niobium content in the antimony-containing niobium powder is reduced and the capacitance decreases. Accordingly, the amount of antimony in the antimony-containing niobium powder is preferably from about 0.1 to about 10 mol %, and from the viewpoint of further reducing the specific leakage current value, more preferably from about 0.3 to about 3 mol %.

The antimony-containing niobium powder for use in the production of a sintered body preferably has an average particle size of about 0.2 μm to less than about 5 μm. If the average particle size is less than about 0.2 μm, when a sintered body is produced from the powder and a capacitor is fabricated using the sintered body, the pores inside the sintered body are excessively small. Therefore, a cathode material, which is described later, cannot be easily impregnated. If the average particle size is about 5 μm or more, a preferred specific leakage current can hardly be obtained, because the capacitance and the leakage current differ in variation with respect to the average particle size. Accordingly, the average particle size is preferably from about 0.2 μm to less than about 5 μm and from the viewpoint of further reducing the specific leakage current value, more preferably from about 0.5 μm to less than about 2 μm.

The average particle size as used in the present invention means a $D_{50}$ value (a particle size when the cumulative % by mass is 50% by mass) measured using a particle size distribution measuring apparatus ("Micro-track", trade name). The antimony-containing niobium powder having an average particle size in the above-described range can be obtained, for example, by a method of pulverizing and dehydrogenating a hydride of a niobium-antimony alloy ingot, pellet or powder, or by a method of carbon-reducing a mixture of niobium oxide and antimony oxide. In the case of obtaining the antimony-containing niobium powder by pulverizing and dehydrogenating a hydride of a niobium-antimony alloy ingot, an antimony-containing niobium powder having a desired average particle size can be obtained by controlling the amount of the niobium-antimony alloy ingot hydrogenated, the pulverization time, the grinding machine or the like.

The thus-obtained antimony-containing niobium powder may be mixed with a niobium powder having an average particle size of about 0.2 μm to less than about 5 μm. The niobium powder added here may be obtained, for example, by a method of pulverizing a sodium reduction product of potassium fluoroniobate, a method of pulverizing and dehydrogenating a hydroxide of a niobium ingot, or a method of carbon-reducing a niobium oxide.

In order to further improve the leakage current value of the thus-obtained antimony-containing niobium powder, a part of the antimony-containing niobium powder may be bonded to at least one of nitrogen, carbon, boron and sulfur. The powder may comprise any of these bonded products with nitrogen, carbon, boron or sulfur, namely, antimony-containing niobium nitride, antimony-containing niobium carbide, antimony-containing niobium boride and antimony-containing niobium sulfide. Also, these bonded products may be used in combination of two, three or four thereof.

The sum total of the bond amounts, that is, the contents of nitrogen, carbon, boron and sulfur, varies depending on the shape of the antimony-containing niobium powder. However, in the case of powder having an average particle size of from about 0.2 to about 5 μm, the sum total is preferably from about 50 to about 200,000 ppm, more preferably from about 200 to about 20,000 ppm. If the total content is less than about 50 ppm, the LC property cannot be improved, whereas if it exceeds about 200,000 ppm, the capacitance property deteriorates and the fabricated product is not suitable as a capacitor.

The nitriding of the antimony-containing niobium powder can be performed by any one of liquid nitriding, ionitriding, gas nitriding or by a combination thereof. Among these, the method of performing the gas nitriding of niobium powder in a nitrogen gas atmosphere is preferred because the apparatus used is simple and operation is easy. For example, gas nitriding can be attained by allowing the above-described antimony-containing niobium powder to stand in a nitrogen gas atmosphere.

The antimony-containing niobium powder having a desired nitrided amount can be obtained by performing the nitriding treatment at an atmosphere temperature of about 2,000° C. or less for a period of tens of hours. The treatment time can be shortened by performing this treatment at a higher temperature.

The carbonization of the antimony-containing niobium powder may be performed by any one of gas carbonization, solid phase carbonization and liquid carbonization. For example, the antimony-containing niobium powder may be carbonized by allowing it to stand with a carbon source such as carbon material or an organic material having carbon (e.g., methane), at about 2,000° C. or less for several minutes to tens of hours under reduced pressure.

The boronizing of the antimony-containing niobium powder may be performed by any one of gas boronizing and solid phase boronizing. For example, the antimony-containing niobium powder may be boronized by allowing it to stand with a boron source, such as boron pellet or boron halide (e.g., trifluoroboron), at about 2,000° C. or less for several minutes to tens of hours under reduced pressure.

The sulfurization of the antimony-containing niobium powder may be performed by any one of gas sulfurization, ion sulfurization and solid phase sulfurization. For example, the gas sulfurization in a sulfur gas atmosphere can be attained by allowing the antimony-containing niobium powder to be present in a sulfur gas atmosphere. The antimony-containing niobium powder having a desired sulfurized amount can be obtained by performing the sulfurization treatment in an atmosphere at a temperature of about 2,000° C. or less for a period of tens of hours. By performing this treatment at a higher temperature, the treatment time can be shortened.

The antimony-containing niobium powder for capacitors of the present invention may be used after granulating the antimony-containing niobium powder into an appropriate shape or may be used by mixing an appropriate amount of non-granulated niobium powder after the granulation. For granulation, a conventionally known method can be used. Examples thereof include a method where non-granulated antimony-containing niobium powder is allowed to stand in a high vacuum, heated to a predetermined temperature and then cracked, and a method where non-granulated antimony-containing niobium powder is mixed with a binder, such as camphor, poly(acrylic acid) or poly(methyl acrylic acid ester), and then cracked.

The antimony-containing niobium sintered body of the present invention is produced by sintering the above-described antimony-containing niobium powder. One example of the method for producing the sintered body is described below, however, the production method for the sintered body of the present invention is not limited thereto. For example, the antimony-containing niobium powder may be press-molded into a predetermined shape and then heated at a temperature of about 500 to about 2,000° C., preferably from about 900 to about 1,500° C., more preferably from about 900 to about 1,250° C., for several minutes to several hours under a pressure of about 1 to about $10^{-7}$ Torr ((1 to $10^{-7}$)×133 Pa).

The manufacture of a capacitor device is described below.

For example, a lead wire comprising a valve-acting metal such as niobium or tantalum and having appropriate shape and length is prepared and this lead wire is integrally molded during the above-described press-molding of the niobium powder so that a part of the lead wire is inserted into the inside of the molded article, thereby the lead wire can work out to a leading line of the sintered body.

Using this sintered body as an electrode of a pair of electrodes, a capacitor can be manufactured by interposing a dielectric material between this electrode and another electrode. The dielectric material used here for the capacitor is preferably a dielectric material mainly comprising niobium oxide. The dielectric material mainly comprising niobium oxide can be easily obtained, for example, by chemically forming the antimony-containing niobium sintered body as an electrode in an electrolytic solution. The chemical forming of the antimony-containing niobium electrode in an electrolytic solution is usually performed using an aqueous protonic acid solution such as aqueous 0.1% phosphoric acid solution, sulfuric acid, 10% acetic acid or adipic acid. In the case of chemically forming the antimony-containing niobium electrode in an electrolytic solution to obtain a niobium oxide dielectric material, the capacitor of the present invention is an electrolytic capacitor and the antimony-containing niobium electrode serves as an anode.

The other electrode of the capacitor of the present invention is not particularly limited and for example, at least one material (compound) selected from electrolytic solutions, organic semiconductors and inorganic semiconductors known in the art of aluminum electrolytic capacitors, may be used. Specific examples of the electrolytic solution include a dimethylformamide-ethylene glycol mixed solution having dissolved therein 5% by mass of an isobutyltripropylammonium borotetrafluoride electrolyte, and a propylene carbonate-ethylene glycol mixed solution having dissolved therein 7% by mass of tetraethylammonium borotetrafluoride.

Specific examples of the organic semiconductor include an organic semiconductor comprising a benzene-pyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by formula (1) or (2):

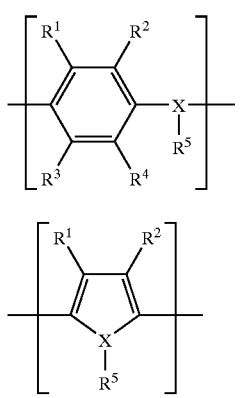

wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$, or $R^3$ and $R^4$ may be combined with each other to form a ring. For the dopant, any known dopant can be used without limit.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

In the specification, "mainly comprising" recited above means to be comprising about 50 mass % and more, preferably about 80 mass % and more.

Examples of the polymer containing two or more repeating units represented by formula (1) or (2) include polyaniline, polyoxyphenylene, poly(phenylene sulfide), polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxothiophene)).

In the case where the organic or inorganic semiconductor used has an electrical conductivity of $10^{-2}$ to $10^3$ S·cm$^{-1}$, the fabricated capacitor can have a smaller impedance value and the capacitance can be further increased at a high frequency.

Furthermore, when the other electrode is solid, an electrical conducting layer may be provided thereon to attain good electrical contact with an exterior leading line (for example, lead frame).

The electrical conducting layer can be formed, for example, by the solidification of an electrically conducting paste, plating, metallization or formation of a heat-resistant electrically conducting resin film. Preferred examples of the electrically conducting paste include silver paste, copper paste, aluminum paste, carbon paste and nickel paste, and these may be used individually or in combination of two or more thereof. When using two or more kinds of pastes are used, the pastes may be mixed or may be superposed one on the other as separate layers. The electrically conducting paste applied is then solidified by allowing it to stand in air or under heating. Examples of the plating include nickel plating, copper plating, silver plating and aluminum plating. Examples of the metal deposited include aluminum, nickel, copper and silver.

More specifically, for example, aluminum paste and silver paste are stacked in this order on the second electrode and are molded with a material such as epoxy resin, thereby constructing a capacitor. This capacitor may have a tantalum lead which is sintered and molded integrally with the niobium sintered body or welded afterward.

The thus-constructed capacitor of the present invention is jacketed using, for example, resin mold, resin case, metallic jacket case, dipping of resin or laminate film, and then used as a capacitor product for various uses.

When the other electrode is liquid, the capacitor constructed by the above-described electrodes and dielectric material is housed, for example, in a can electrically connected to the other electrode to form a capacitor. In this case, the electrode side of the antimony-containing niobium sintered body is guided outside through a niobium or tantalum lead, described above, and at the same time, insulated from the can using an insulating rubber or the like.

By producing a sintered body using niobium powder according to the present invention, as described above, and fabricating a capacitor from the sintered body, a capacitor having good reliability can be obtained.

EXAMPLES

The present invention is described in detail below by referring to the Examples, however, the present invention is not limited to these Examples. Unless indicated otherwise herein, all parts, percents, ratios and the like are by weight.

In the following Examples, the capacitance and the leakage current of the sintered body are measured as follows.

Measurement of Capacitance of Sintered Body

A capacitance at 120 Hz measured at room temperature by connecting an LCR measuring device of HP (LCR Meter manufactured by Hewlett-Packard) between a sintered body dipped in 30% sulfuric acid and an electrode of tantalum material placed in a sulfuric acid solution was designated as the capacitance of the sintered body.

Measurement of Leakage Current of Sintered Body

A d.c. voltage corresponding to 70% of the chemical forming voltage at the time of forming a dielectric material was continuously applied between a sintered body dipped in an aqueous 20% phosphoric acid solution and an electrode placed in an aqueous phosphoric acid solution, at room temperature for 3 minutes, and thereafter a current value was measured and designated as the leakage current value (LC value) of the sintered body. In the present invention, a voltage of −14 V was applied.

In the following Examples, the capacitance and the leakage current value of the capacitor worked into a chip were measured as follows.

Capacitance of Capacitor

The capacitance at 120 Hz was measured at room temperature by connecting an LCR measuring apparatus of HP between the terminals of the manufactured chip and designated as the capacitance of the capacitor worked into a chip.

Leakage Current of Capacitor

Among rated voltages (e.g., 2.5 V, 4 V, 6.3 V, 10 V, 16 V, 25 V, etc.), a d.c. voltage close to about ⅓ to about ¼ of the chemical forming voltage at the time of forming a dielectric material was continuously applied at room temperature between the terminals of the manufactured chip for 1 minute and thereafter, a current value was measured and designated as the leakage current value of the capacitor worked into a chip. In the present invention, a voltage of 6.3 V was applied.

Example 1

Using 98.6 g of niobium ingot and 1.4 g of antimony powder, an antimony-containing niobium ingot having an antimony content of 1.1 mol % was produced by arc melting. In an SUS 304-made reactor, 50 g of the obtained ingot was placed, and hydrogen was continuously introduced thereinto at 400° C. for 10 hours. After cooling, the hydrogenated antimony-containing niobium lump was placed in an SUS 304-made pot containing SUS-made balls and pulverized for 10 hours. Subsequently, this hydride was formed into a 20 vol % slurry with water, charged together with zirconia balls into an SUS 304-made wet grinding machine ("Attritor", trade name), and wet pulverized for 7 hours. The resulting slurry was centrifuged and decanted to obtain a pulverized product.

The pulverized product was dried in a vacuum under conditions of 1 Torr (133 Pa) and 50° C. Subsequently, the hydrogenated antimony-containing niobium powder was dehydrogenated under heating at $10^{-4}$ Torr ($133 \times 10^{-4}$ Pa) and 400° C. for 1 hour. The produced antimony-containing niobium powder had an average particle size of 1.3 µm and the antimony content measured by the atomic absorption analysis was 1 mol %. The thus-obtained antimony-containing niobium powder was molded together with a 0.3-mmφ ("φ" means diameter) in niobium wire to produce a molded article having a size of approximately 0.3×0.18× 0.45 cm (about 0.1 g).

This molded article was allowed to stand in a vacuum of $3 \times 10^{-5}$ Torr at 1,200° C. for 30 minutes and a sintered body was obtained. The sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the leakage current (hereinafter simply referred to as "LC") in an aqueous 20% phosphoric acid solution were measured. The results obtained are shown in Table 1.

Examples 2 to 6-1

In order to change the antimony content of the antimony-containing niobium powder, antimony-containing niobium ingots having an antimony content of 0.1 to 15 mol % were produced while varying the amounts of niobium and antimony treated by arc melting. Thereafter, using 50 g of the antimony-containing niobium ingot having an antimony concentration as shown in Table 1, a sintered body was produced by the same operation as in Example 1, and the capacitance and the LC value of each sintered body were measured. The results obtained are shown in Table 1.

Comparative Example 1, Examples 6-2 and 6-3

Antimony-containing niobium ingots having an antimony content of 0 mol %, 0.04 mol % or 19.3 mol % were produced. Thereafter, using 50 g of the antimony-containing niobium ingot having an antimony concentration of 0 mol %, 0.04 mol % and 19.3 mol %, a sintered body was produced by the same operation as in Examples 2 to 6, and the capacitance and the LC value of each sintered body were measured. The results obtained are shown in Table 1.

Examples 7 to 11-1

In order to change the average particle size of antimony-containing niobium powder, a hydrogenated antimony-containing niobium lump having an antimony content of 1.2 mol % was produced in the same manner as in Example 1, placed in an SUS 304-made pot containing iron-made balls and pulverized for 10 hours. Thereafter, 50 g of this hydride was formed into a 20% slurry with water, charged together with zirconia balls into an SUS 304-made wet grinding machine ("Attritor", trade name), and wet pulverized by varying the time. The resulting slurry was centrifuged and decanted to obtain a pulverized product. The pulverized product obtained was dried in a vacuum under the conditions of 1 Torr and 50° C.

Subsequently, the hydrogenated antimony-containing niobium powder was dehydrogenated under heating at $10^{-4}$ Torr and 400° C. for 1 hour to obtain antimony-containing niobium powder. The obtained antimony-containing niobium powder had an average particle size of 0.2 to 5.1 µm. Furthermore, the thus-obtained antimony-containing niobium powder was molded together with a 0.3-mmφ niobium wire to produce a molded article having a size of approximately 0.3 cm×0.18 cm×0.45 cm (about 0.1 g).

Each of these molded articles was allowed to stand in a vacuum of $2 \times 10^{-5}$ Torr ($2 \times 10^{-5} \times 133$ Pa) at 1,200° C. for 30 minutes to obtain a sintered body. The capacitance and the LC value of each sintered body obtained were measured in the same manner as in Example 1. The results are shown in Table 2.

Examples 11-2 and 11-3

Hydrogenated antimony-containing niobium powder having an antimony content of 1.2 mol % was treated by the same operation as in Examples 7 to 11-1 to obtain antimony-containing niobium powder having an antimony content of 1.2 mol % and an average particle size of 8.8 µm or 22 µm. By using each of the antimony-containing niobium powder obtained, a sintered body was produced and the content and LC value thereof were measured. The results obtained are shown in Table 2.

Examples 12 to 15

In order to change the sintering temperature of the antimony-containing niobium sintered body, an antimony-containing niobium powder having an antimony content of 1.1 mol % and an average particle size of 1.2 μm was produced in the same manner as in Example 1 and molded together with a 0.3-mmφ niobium wire to produce a molded article having a size of approximately 0.3×0.18×0.45 cm (about 0.1 g). Then, the molded article was allowed to stand in a vacuum of $6 \times 10^{-6}$ to $5 \times 10^{-5}$ Torr at a temperature of 1,100 to 1,300° C. for 30 to 100 minutes to obtain various sintered bodies. The capacitance and the LC value of each sintered body obtained were measured in the same manner as in Example 1. The results are shown in Table 3.

Examples 16 to 20

In order to obtain an antimony-containing niobium nitride, 10 g of antimony-containing niobium powder having an antimony content of 1.2 mol % and an average particle size of 1.4 μm was produced in the same manner as in Example 1 and charged into an SUS 304-made reactor, and nitrogen was continuously introduced thereinto at 300° C. for 0.5 to 20 hours to obtain antimony-containing niobium nitrides. The nitrogen amount of each nitride was determined using a nitrogen amount measuring apparatus manufactured by LECO, which determines the nitrogen amount from thermal conductivity. The ratio of the measured value to the separately measured mass of powder was designated as the nitrided amount. The nitrided amount was from 0.02 to 0.88% by mass. The thus-obtained antimony-containing niobium nitride was molded and sintered in the same manner as in Example 1, and the sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC value in an aqueous 20% phosphoric acid solution were measured. The results obtained are shown in Table 4.

TABLE 1

| | Antimony Content [mol %] | Average Particle Size [μm] | Capacitance [μF] | LC Value [μA] | Specific Leakage Current Value [pA/(μF · V)] |
|---|---|---|---|---|---|
| Example 1 | 1.1 | 1.3 | 502 | 2.8 | 279 |
| Example 2 | 0.09 | 1.3 | 487 | 3.8 | 390 |
| Example 3 | 0.45 | 1.4 | 495 | 2.9 | 297 |
| Example 4 | 3.8 | 1.3 | 488 | 3.0 | 307 |
| Example 5 | 9.7 | 1.2 | 473 | 3.0 | 317 |
| Example 6-1 | 14.3 | 1.2 | 449 | 3.0 | 334 |
| Comparative Example 1 | 0 | 1.3 | 432 | 39.1 | 4525 |
| Example 6-2 | 0.04 | 1.3 | 451 | 7.8 | 865 |
| Example 6-3 | 19.3 | 1.1 | 402 | 3.3 | 410 |

TABLE 2

| | Antimony Content [mol %] | Average Particle Size [μm] | Capacitance [μF] | LC Value [μA] | Specific Leakage Current Value [pA/(μF · V)] |
|---|---|---|---|---|---|
| Example 7 | 1.2 | 0.2 | 1167 | 9.3 | 399 |
| Example 8 | 1.2 | 0.7 | 649 | 4.4 | 342 |
| Example 9 | 1.2 | 1.3 | 502 | 3.0 | 299 |
| Example 10 | 1.2 | 2.6 | 268 | 1.7 | 317 |
| Example 11-1 | 1.2 | 5.1 | 202 | 1.3 | 322 |
| Example 11-2 | 1.2 | 12 | 91 | 0.8 | 440 |
| Example 11-3 | 1.2 | 22 | 62 | 0.6 | 484 |

TABLE 3

| | Sintering Temperature [° C.] | Sintering Time [min] | Capacitance [μF] | LC Value [μA] | Specific Leaking Current Value [pA/(μF · V)] |
|---|---|---|---|---|---|
| Example 12 | 1100 | 100 | 689 | 4.4 | 319 |
| Example 13 | 1150 | 100 | 601 | 3.7 | 308 |
| Example 14 | 1200 | 30 | 510 | 3.0 | 299 |
| Example 15 | 1300 | 30 | 302 | 1.7 | 281 |

TABLE 4

| | Antimony Content [mol %] | Nitrogen Content [wt %] | Capacitance [μF] | LC Value [μA] | Specific Leakage Current Value [pA/(μF · V)] |
|---|---|---|---|---|---|
| Example 16 | 1.2 | 0.02 | 499 | 2.7 | 270 |
| Example 17 | 1.2 | 0.12 | 505 | 2.9 | 287 |
| Example 18 | 1.2 | 0.26 | 503 | 2.8 | 278 |
| Example 19 | 1.2 | 0.45 | 497 | 3.1 | 312 |
| Example 20 | 1.2 | 0.88 | 501 | 3.5 | 349 |

Examples 21 to 24

In order to obtain a sintered body comprising a mixture of antimony-containing niobium powder and niobium powder, antimony-containing niobium powder having an antimony content of 10 mol % and an average particle size of 2.4 μm was obtained in the same manner as in Example 1. Separately, into a nickel-made crucible, 20 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried in a vacuum and pulverized for 40 hours using a ball mill in an alumina pot containing silica alumina balls. The pulverized product was dipped and stirred in a 3:2 (by mass) mixed solution of 50% nitric acid and 10% aqueous hydrogen peroxide.

Thereafter, the pulverized product was thoroughly washed with water until the pH reached 7 to remove impurities, and dried in a vacuum. The produced niobium powder had an average particle size of 2.6 μm. The thus-obtained antimony-containing niobium powder was well mixed with niobium powder at an arbitrary ratio, as shown in Table 5, the mixture was molded and sintered in the same manner as in Example 1 to obtain sintered bodies. The capacitance and the LC value of each sintered body were measured and the results obtained are shown in Table 5.

Examples 25 to 28

In order to obtain a sintered body of antimony-containing niobium nitride comprising a mixture of antimony-containing niobium powder and niobium powder, antimony-containing niobium powder having an antimony content of 10 mol % and an average particle size of 1.2 μm was obtained in the same manner as in Example 1. Separately, 50 g of niobium ingot was placed in an SUS 304-made reactor and hydrogen was continuously introduced thereinto at 400° C. for 12 hours. After cooling, the hydrogenated niobium lump was placed in an SUS 304-made pot containing iron-made balls and pulverized for 10 hours. This pulverized product was charged into the above-described SUS 304-made reactor and again hydrogenated under the above-described conditions.

Subsequently, this hydride was formed into a 20 vol % slurry with water, charged together with zirconia balls into an SUS 304-made wet grinding machine ("Attritor", trade name), and wet pulverized for 6 hours. The resulting slurry was centrifuged and decanted to obtain a pulverized product. The pulverized product was dried in a vacuum under the conditions of 1 Torr and 50° C. Subsequently, the hydrogenated niobium powder was dehydrogenated under heating at $10^{-4}$ Torr and 400° C. for 1 hour. The produced niobium powder had an average particle size of 1.3 μm. The thus-obtained antimony-containing niobium powder was well mixed with niobium powder at an arbitrary ratio, as shown in Table 6, nitrides were obtained in the same manner as in Example 16 to 20, and molded and sintered to obtain sintered bodies. The capacitance and the LC value of each sintered body were measured and the results obtained are shown in Table 6.

TABLE 5

| | Mixing Ratio (antimony-containing niobium powder/niobium powder by reduction) | Capacitance [μF] | LC Value [μA] | Specific Leakage Current Value [pA/(μF · V)] |
|---|---|---|---|---|
| Example 21 | 90:10 | 239 | 1.7 | 356 |
| Example 22 | 50:50 | 261 | 1.9 | 364 |
| Example 23 | 20:80 | 259 | 1.6 | 309 |
| Example 24 | 10:90 | 268 | 1.7 | 317 |

TABLE 6

| | Mixing Ratio (antimony-containing niobium powder/niobium powder by pulverization) | Nitrogen Content [wt %] | Capacitance [μF] | LC Value [μA] | Specific Leakage Current Value [pA/(μF · V)] |
|---|---|---|---|---|---|
| Example 25 | 90:10 | 0.05 | 469 | 3.0 | 320 |
| Example 26 | 50:50 | 0.51 | 486 | 2.9 | 298 |
| Example 27 | 20:80 | 0.95 | 495 | 2.9 | 292 |
| Example 28 | 10:90 | 0.25 | 505 | 3.0 | 297 |

Examples 29 to 35

50 Units of each sintered body were obtained, in Example 29 in the same manner as in Example 1, in Example 30 in the same manner as in Example 5, in Example 31 in the same manner as in Example 7, in Example 32 in the same manner as in Example 13, in Example 33 in the same manner as in Example 18, in Example 34 in the same manner as in Example 23, and in Example 35 in the same manner as in Example 28. Each of these sintered bodies was electrochemically formed using an aqueous 0.1% phosphoric acid solution at a voltage of 20 V for 200 minutes to form an oxide dielectric film on the surface. Subsequently, an operation of dipping each sintered body in an aqueous 60% manganese nitrate solution and heating it at 220° C. for 30 minutes was repeated to form a manganese dioxide layer as the other electrode layer on the oxide dielectric film. On this other electrode layer, a carbon layer and a silver paste layer were stacked in this order. After mounting a lead frame thereon, the device as a whole was molded with an epoxy resin to manufacture a chip-type capacitor. The capacitance and the LC value each in average of the chip-type capacitors (n=50 units in each Example) are shown in Table 7. The LC value is a value measured at room temperature by applying a voltage of 6.3 V for 1 minute.

TABLE 7

| | Sintered Body | Chip | |
|---|---|---|---|
| | Specific Leakage Current Value [pA/(μF · V)] | LC Value [μA] | Capacitance [μF] |
| Example 29 | 279 | 2.6 | 467 |
| Example 30 | 317 | 2.7 | 445 |
| Example 31 | 399 | 8.2 | 1080 |
| Example 32 | 308 | 3.3 | 555 |
| Example 33 | 278 | 2.6 | 469 |
| Example 34 | 309 | 1.5 | 252 |
| Example 35 | 297 | 2.9 | 472 |

Examples 36 to 42

50 Units of each sintered body were obtained, in Example 36 in the same manner as in Example 2, in Example 37 in the same manner as in Example 6-1, in Example 38 in the same manner as in Example 8, in Example 39 in the same manner as in Example 15, in Example 40 in the same manner as in Example 19, in Example 41 in the same manner as in Example 21, and in Example 42 in the same manner as in Example 26. Each of these sintered bodies was electrochemically formed using an aqueous 0.1% phosphoric acid solution at a voltage of 20 V for 200 minutes to form an oxide dielectric film on the surface. Subsequently, an operation of dipping each sintered body in a mixed solution of an aqueous 35% lead acetate solution and an aqueous 35% ammonium persulfate solution (1:1 by volume) and allowing the reaction to proceed at 40° C. for 1 hour was repeated to form a mixed layer of lead dioxide and lead sulfate as the other electrode layer on the oxide dielectric film. On this other electrode layer, a carbon layer and a silver paste layer were stacked in this order. After mounting a lead frame thereon, the device as a whole was molded with an epoxy resin to manufacture a chip-type capacitor. The capacitance and the LC value each in average of the chip-type capacitors (n=50 units in each Example) are shown in Table 8. The LC value is a value measured at room temperature by applying a voltage of 6.3 V for 1 minute.

TABLE 8

|  | Sintered Body | Chip | |
| --- | --- | --- | --- |
|  | Specific Leakage Current Value [pA/($\mu$F·V)] | LC Value [$\mu$A] | Capacitance [$\mu$F] |
| Example 36 | 390 | 2.5 | 452 |
| Example 37 | 334 | 2.6 | 421 |
| Example 38 | 342 | 4.7 | 599 |
| Example 39 | 281 | 1.8 | 289 |
| Example 40 | 312 | 2.6 | 462 |
| Example 41 | 356 | 1.4 | 229 |
| Example 42 | 298 | 2.6 | 455 |

The sintered body using the antimony-containing niobium powder of the present invention exhibits good properties in the specific leakage current value, and the capacitor manufactured using the sintered body is favored with a small LC value, and therefore, a highly reliable capacitor can be obtained.

While the invention has been described in detail and with reference to specific embodiments thereof, it will be apparent to one skilled in the art that various changes and modifications can be made therein without departing from the spirit and scope thereof.

What is claimed is:

1. A niobium powder for capacitors, comprising niobium and antimony.

2. The niobium powder for capacitors as claimed in claim 1, wherein a content of antimony is from about 0.1 to about 10 mol %.

3. The niobium powder for capacitors as claimed in claim 1, wherein an average particle size of the powder is from about 0.2 $\mu$m to less than about 5 $\mu$m.

4. The niobium powder for capacitors as claimed in claim 2, wherein an average particle size of the powder is from about 0.2 $\mu$m to less than about 5 $\mu$m.

5. A sintered body comprising sintered niobium powder, wherein the niobium powder is described in claim 1.

6. A sintered body comprising sintered niobium powder, wherein the niobium powder is described in claim 2.

7. The sintered body as claimed in claim 5, which has a specific leakage current value of about 400 pA/($\mu$F·V) or less.

8. The sintered body as claimed in claim 6, which has a specific leakage current value of about 400 pA/($\mu$F·V) or less.

9. A capacitor comprising the sintered body described in claim 7, as one electrode, a dielectric material formed on the surface thereof, and a second electrode.

10. A capacitor comprising the sintered body described in claim 8, as one electrode, a dielectric material formed on the surface thereof, and a second electrode.

11. The capacitor as claimed in claim 9, wherein the dielectric material comprises niobium oxide.

12. The capacitor as claimed in claim 10, wherein the dielectric material comprises niobium oxide.

13. The capacitor as claimed in claim 11, wherein the niobium oxide is formed by electrolytic oxidation.

14. The capacitor as claimed in claim 12, wherein the niobium oxide is formed by electrolytic oxidation.

15. The capacitor as claimed in claim 9, wherein the second electrode is at least one material selected from the group consisting of an electrolytic solution, an organic semiconductor and an inorganic semiconductor.

16. The capacitor as claimed in claim 10, wherein the second electrode is at least one material selected from the group consisting of an electrolytic solution, an organic semiconductor and an inorganic semiconductor.

17. The capacitor as claimed in claim 9, wherein the second electrode is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by formula (1) or (2):

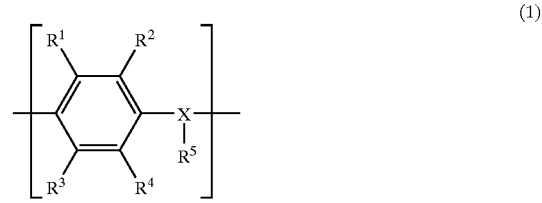

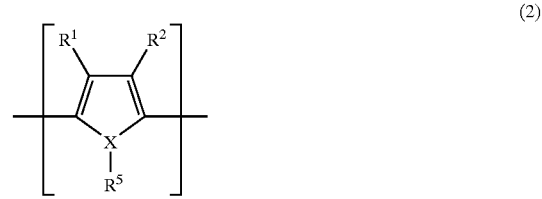

wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$, or $R^3$ and $R^4$ may be combined with each other to form a ring.

18. The capacitor as claimed in claim 10, wherein the second electrode is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by formula (1) or (2):

(1)
(2)

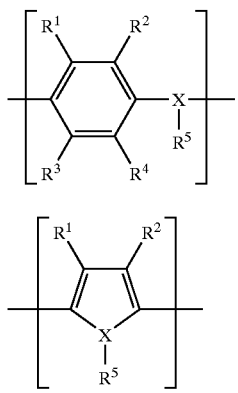

wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$, or $R^3$ and $R^4$ may be combined with each other to form a ring.

19. The capacitor as claimed in claim 15, wherein the organic semiconductor is at least one member selected from the group consisting of polypyrrole, polythiophene and substitution derivatives thereof.

20. The capacitor as claimed in claim 16, wherein the organic semiconductor is at least one member selected from the group consisting of polypyrrole, polythiophene and substitution derivatives thereof.

* * * * *